(12) United States Patent
Ho et al.

(10) Patent No.: US 10,200,093 B2
(45) Date of Patent: Feb. 5, 2019

(54) BEAMFORMING METHOD OF MILLIMETER WAVE COMMUNICATION AND BASE STATION AND USER EQUIPMENT USING THE SAME

(71) Applicant: Industrial Technology Research Institute, Hsinchu (TW)

(72) Inventors: Chung-Lien Ho, Hsinchu (TW); Ren-Jr Chen, Hsinchu (TW); Wen-Chiang Chen, Hsinchu (TW)

(73) Assignee: Industrial Technology Research Institute, Hsinchu, Taiwan (CN)

( * ) Notice: Subject to any disclaimer, the term of this patent is extended or adjusted under 35 U.S.C. 154(b) by 249 days.

(21) Appl. No.: 14/979,547

(22) Filed: Dec. 28, 2015

(65) Prior Publication Data

US 2016/0242159 A1 Aug. 18, 2016

Related U.S. Application Data

(60) Provisional application No. 62/116,931, filed on Feb. 17, 2015.

(30) Foreign Application Priority Data

Dec. 23, 2015 (EP) .................................... 15202261

(51) Int. Cl.
*H04B 7/06* (2006.01)
*H04B 7/0408* (2017.01)
(Continued)

(52) U.S. Cl.
CPC ......... *H04B 7/0408* (2013.01); *H04B 7/0617* (2013.01); *H04B 7/0639* (2013.01);
(Continued)

(58) Field of Classification Search
None
See application file for complete search history.

(56) References Cited

U.S. PATENT DOCUMENTS 8,594,053 B2  11/2013 Kim et al.
2008/0247371 A1 10/2008 Kwon et al.
(Continued)

FOREIGN PATENT DOCUMENTS

CN  102511187  6/2012
CN  103765792  4/2014
(Continued)

OTHER PUBLICATIONS

IEEE Standard Association, "IEEE Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements for Very High Throughput in the 60 GHz Band," IEEE Std 802.11ad-2012, Dec. 28, 2012, pp. 1-628.
(Continued)

*Primary Examiner* — Huy D Vu
*Assistant Examiner* — Bao G Nguyen
(74) *Attorney, Agent, or Firm* — JCIPRNET

(57) ABSTRACT

A beamforming method of millimeter wave communication is introduced herein. the beamforming method is adapted to a base station and includes following steps. A plurality of periodic signals are transmitted by using a frame header of M radio frames via Q base station beams designated as Q scan beams while performing a network entry, wherein M≥1 and Q≥1. Data packets are transceived by using a payload region of the M radio frames via at least one scheduled beam while a user equipment connection is performed via the scheduled beam selected from the Q base station beams.

36 Claims, 9 Drawing Sheets

(51) Int. Cl.
*H04W 48/00* (2009.01)
*H04W 16/28* (2009.01)

(52) U.S. Cl.
CPC .......... *H04B 7/0695* (2013.01); *H04W 48/00* (2013.01); *H04W 16/28* (2013.01)

(56) References Cited

U.S. PATENT DOCUMENTS

| | | | |
|---|---|---|---|
| 2010/0014463 A1* | 1/2010 | Nagai | H04B 7/0695 370/328 |
| 2010/0135238 A1 | 6/2010 | Sadri et al. | |
| 2011/0038356 A1 | 2/2011 | Bachrach | |
| 2011/0051746 A1* | 3/2011 | Chang | H04L 1/0052 370/474 |
| 2011/0069636 A1 | 3/2011 | Shao et al. | |
| 2011/0182174 A1 | 7/2011 | Pi et al. | |
| 2011/0243040 A1 | 10/2011 | Khan et al. | |
| 2012/0052828 A1* | 3/2012 | Kamel | H04B 7/0408 455/226.2 |
| 2012/0120998 A1 | 5/2012 | Fakhrai et al. | |
| 2012/0206299 A1 | 8/2012 | Valdes-Garcia | |
| 2012/0307726 A1 | 12/2012 | Pi et al. | |
| 2012/0320874 A1 | 12/2012 | Li et al. | |
| 2013/0064239 A1 | 3/2013 | Yu et al. | |
| 2013/0252548 A1 | 9/2013 | Levy et al. | |
| 2013/0343247 A1 | 12/2013 | Kasher | |
| 2014/0072078 A1 | 3/2014 | Sergeyev et al. | |
| 2014/0126620 A1 | 5/2014 | Maltsev et al. | |
| 2014/0203969 A1 | 7/2014 | Maltsev et al. | |
| 2014/0210666 A1 | 7/2014 | Maltsev et al. | |
| 2014/0235287 A1 | 8/2014 | Maltsev et al. | |
| 2015/0009968 A1 | 1/2015 | Yu et al. | |
| 2015/0103934 A1 | 4/2015 | Nam et al. | |
| 2015/0103937 A1 | 4/2015 | Cudak et al. | |
| 2015/0173004 A1* | 6/2015 | Nigam | H04W 48/16 370/331 |
| 2015/0208320 A1* | 7/2015 | Alexander | H04W 40/246 370/254 |
| 2015/0245251 A1 | 8/2015 | Somayazulu et al. | |

FOREIGN PATENT DOCUMENTS

| | | |
|---|---|---|
| CN | 103988551 | 8/2014 |
| CN | 104079334 | 10/2014 |
| CN | 104185269 | 12/2014 |
| CN | 105210444 | 12/2015 |
| EP | 2104245 | 9/2009 |
| TW | 201338479 | 9/2013 |
| WO | 2014124237 | 8/2014 |
| WO | 2014172306 | 1/2015 |

OTHER PUBLICATIONS

"Office Action of Europe Counterpart Application", dated Jul. 19, 2016, p. 1-p. 9.

Pi et al., "An introduction to millimeter-wave mobile broadband systems," IEEE Communications Magazine, Jun. 2011, pp. 101-107.

Roh et al., "Millimeter-wave beamforming as an enabling technology for 5G cellular communications: theoretical feasibility and prototype results," IEEE Communications Magazine, Feb. 2014, pp. 106-113.

Rajagopal et al., "Antenna Array Design for Multi-Gbps mmWave Mobile Broadband Communication," IEEE Global Telecommunications Conference, Dec. 5-9, 2011, pp. 1-6.

Khan et al., "Millimeter-wave mobile broadband with large scale spatial processing for 5G mobile communication," 50th Annual Allerton Conference on Communication, Control, and Computing (Allerton), Oct. 1-5, 2012, pp.1517-1523.

Kim et al., "Tens of Gbps support with mmWave beamforming systems for next generation communications," IEEE Global Communications Conference (GLOBECOM), Dec. 9-13, 2013, pp. 3685-3690.

Yin et al., "High-throughput beamforming receiver for millimeter wave mobile communication," IEEE Global Communications Conference (GLOBECOM), Dec. 9-13, 2013, pp. 3697-3702.

"Office Action of China Counterpart Application," dated Jun. 8, 2018, pp. 1-6.

* cited by examiner

BEAMFORMING METHOD OF MILLIMETER WAVE COMMUNICATION AND BASE STATION AND USER EQUIPMENT USING THE SAME

CROSS-REFERENCE TO RELATED APPLICATION

This application claims the priority benefits of U.S. provisional application Ser. No. 62/116,931, filed on Feb. 17, 2015 and Europe application serial no. 15202261.2, filed on Dec. 23, 2015. The entirety of the above-mentioned patent application is hereby incorporated by reference herein and made a part of this specification.

TECHNICAL FIELD

The disclosure generally relates to a beamforming method of millimeter wave communication and a base station and a user equipment using the same method.

BACKGROUND

Despite the advancements in technologies, wireless communication technologies using the millimeter wave (also referred to as mmWave) are still facing certain technical difficulties. Basically, the first problem that use of the millimeter wave may encounter is severe attenuation of wave energy during transmission, which is highly related to millimeter wave communication systems operated in high frequency bands while using a sizable bandwidth for communication. More specifically, the millimeter wave communication systems use the frequency band with relatively high frequency for communication as compared to the third generation (3G) or the fourth generation (4G) communication systems which are commonly used nowadays, and it is well know that the propagation is poorer at higher frequencies (e.g. millimeter wave) than lower frequencies (e.g. micro wave). Energy intensity of an electromagnetic wave signal received by a receiver is inversely proportional to a square of a signal transmitting distance and is proportional to a wavelength of the electromagnetic wave signal, such that the attenuation degree of the signal energy will be significantly increased if the millimeter wave communication systems use the high frequency signal with short wavelength. That is, path loss in the millimeter wave communication systems is severe. Also, the high frequency signal will also cause sudden reduction in the antenna aperture, which may result in decrement of the signal energy of the transmitting signal in the millimeter wave communication systems.

Further, because of the electromagnetic wave signal operated in high frequency band, the capability of the transmitting/receiving signals in the millimeter wave communication systems for penetrating obstacles is significantly reduced. Generally, with respect to the millimeter wave communication systems, a system performance thereof is very sensitive to the obstacles on the signal transmission path. That is, consideration regarding whether the signal transmission takes place in the Line of Sight (LOS) and the Non Line of Sight (NLOS) environment becomes very important. Moreover, the energy of the millimeter wave may also be absorbed by, for example, rainy days, oxygen and water steam in the air, and the like. In addition, in order to accomplish high data transmission efficiency, the millimeter wave communications use the sizable bandwidth (e.g., 500 MHz to 1 GHz) for the data transmission, which will significantly increase the noise energy and accordingly reduce the signal-to-noise ratio. Therefore, in order to ensure the communication quality, a transceiver in the millimeter wave systems usually requires use of a multiple antenna beamforming technology to reduce the attenuation of the signal energy, so as to improve the efficiency for gaining the transceiving signals.

Generally, in related art, an antenna array including multiple antennas is disposed on a base station/a user equipment, so that beams with directivity may be generated by the base station/the user equipment by controlling the antennas. The beamforming technologies accomplished by the antenna array is one of the key factors for influencing performance of a millimeter wave wireless communication system. More specifically, because the beams generated by the base station/the user equipment have adjustable beam direction and beam pattern, the beam direction and the beam pattern of the beams can directly influence whether a data transmission path can be established between the base station and the user equipment. For example, the base station can establish the data transmission path with the user equipment through a beam scan, and the beam scan is performed by the base station for the beams with limited coverage which are sequentially sent towards different directions within cellular cells. Therefore, filed of view (FoV) of the beam also become one of the important factors for determining a time required in establishment of the data transmission path between the base station and the user equipment. Accordingly, it has become one of important issues to be solved for persons skilled in the art as how to improve performance of the millimeter wave wireless communication system by using the beamforming method technologies.

SUMMARY

Accordingly, the present disclosure proposes a beamforming method of millimeter wave communication. More particularly, the present disclosure proposes a beamforming method of millimeter wave communication and a base station and a user equipment using the same to effectively manage beams and schedule the preferred beam for data transmission.

A beamforming method of millimeter wave communication is introduced herein. According to an exemplary embodiment, the beamforming method is adapted to a base station which is capable of generating Q base station beams. The beamforming method includes following steps. A plurality of periodic signals are transmitted by using a frame header of M radio frames via the Q base station beams designated as Q scan beams while performing a network entry, wherein M≥1 and Q≥1. Data packets are transceived by using a payload region of the M radio frames via at least one of the Q base station beams designated as at least one scheduled beam while a user equipment connection is performed via the scheduled beam selected from the Q base station beams.

A base station is introduced herein. According to an exemplary embodiment, the base station, which is capable of generating Q base station beams, includes a transceiving circuit and a processing circuit. The transceiving circuit is configured to transmit and receive a wireless signal of millimeter wave communication. The processing circuit coupled to the transceiver circuit is configured to transmit a plurality of periodic signals by using a frame header of M radio frames via the Q base station beams designated as Q scan beams while performing a network entry, wherein M≥1 and Q≥1. The processing circuit is configured to transceive data packets by using a payload region of the M radio frames via at least one of the Q base station beams designated as at least one scheduled beam while performing a user equipment connection via the scheduled beam selected from the Q base station beams.

A beamforming method of millimeter wave communication is introduced herein. According to an exemplary embodiment, the beamforming method is adapted to a user equipment. The beamforming method includes following steps. A plurality of periodic signals are received by using a frame header of at least one of M radio frames via at least one of Q base station beams designated as at least one of Q scan beams while performing a network entry, wherein M≥1 and Q≥1. At least one of the Q base station beams designated as at least one scheduled beam is determined from the Q base station beams. Data packets are transceived by using a payload region of at least one of the M radio frames via the at least one scheduled beam while a user equipment connection is performed via the scheduled beam selected from the Q base station beams.

A user equipment is introduced herein. According to an exemplary embodiment, the user equipment includes a transceiving circuit and a processing circuit. The transceiving circuit is configured to transmit and receive a wireless signal of millimeter wave communication. The processing circuit coupled to the transceiver circuit is configured to receive a plurality of periodic signals by using a frame header of at least one of M radio frames via at least one of Q base station beams designated as at least one of scan beams while performing a network entry, wherein M≥1 and Q≥1. The processing circuit is configured to determine at least one of the Q base station beams designated as at least one scheduled beam from the Q base station beams, and transceive data packets by using a payload region of at least one of the M radio frames via the at least one scheduled beam while performing a user equipment connection via the scheduled beam selected from the Q base station beams.

To sum up, in a frame header of a radio frame, a plurality of base station beams designated as a plurality of scan beams with different beam directions are sequentially and periodically emitted by the base station. In addition, in a payload of the radio frame, at least one schedule beam chosen from the base station beams is dynamically scheduled and emitted by the base station for data packet transmission.

In order to make the aforementioned features and advantages of the present disclosure comprehensible, embodiments accompanied with figures are described in detail below. It is to be understood that both the foregoing general description and the following detailed description are exemplary, and are intended to provide further explanation of the invention as claimed.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the disclosure.

DESCRIPTION OF THE EMBODIMENTS

Figure 1A:
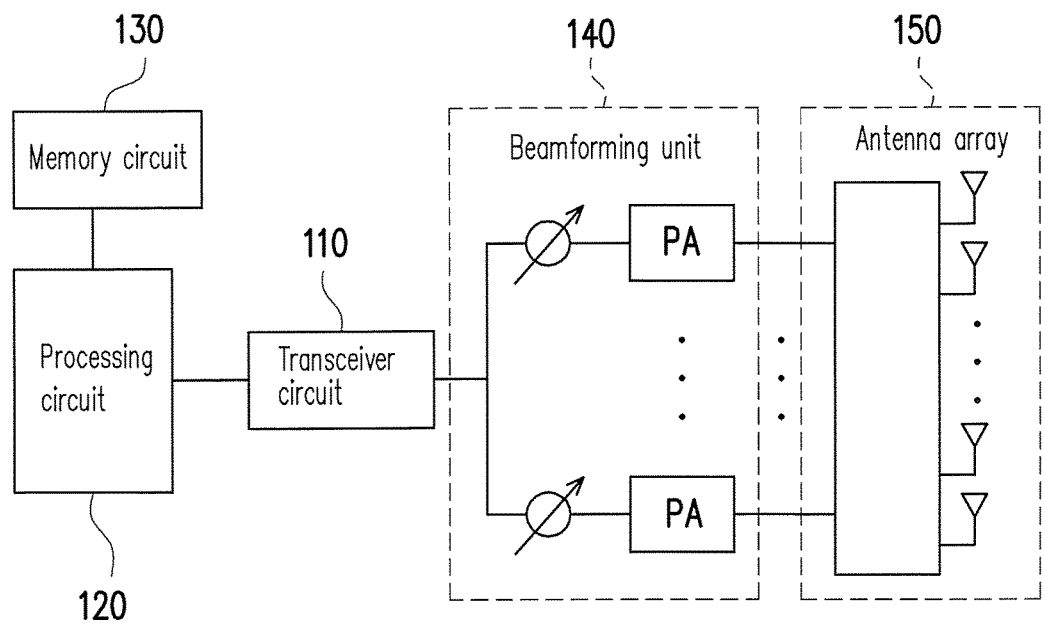
FIG. 1A is a block diagram illustrating a base station according to an exemplary embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Reference will now be made with the accompanying drawings in order to provide a thorough understanding of the disclosed embodiments of the present disclosure for those skilled in the art. The inventive ideas can adopt various implementations, rather than being limited to these embodiments. Descriptions of the well-known parts are omitted in the present disclosure, and the same reference numbers are used in the present disclosure to refer to the same or like parts.

In the present disclosure, the term "base station" (BS) can represent various embodiments, which may include (but not limited to), for example, a home evolved node B (HeNB), an eNB, an advanced base station (ABS), a base transceiver system (BTS), an access point, a home base station, a relay, a scatterer, a repeater, an intermediate node, an intermediary and/or a satellite-based communication base station.

According to the embodiments of the present disclosure, the base station may at least be represented by function devices illustrated in FIG. 1A. A base station 100 may at least include (but not limited to) a transceiver circuit 110, a processing circuit 120, a memory circuit 130 (optional), a beamforming unit 140 and an antenna array 150.

The transceiver circuit 110 is capable of transmitting an uplink (UL) signal and/or receiving a downlink (DL) signal in a wireless manner. The transceiver circuit 110 can also perform operations such as low noise amplifying, impedance matching, frequency mixing, frequency up-converting or down-converting, filtering, amplification and the like. For example, the transceiver circuit 110 may include an amplifier, a mixer, an oscillator, an analog-to-digital converter (ADC)/a digital-to-analog converter (DAC), a filter and the like. The ADC is configured to convert an analog signal format into a digital signal format during an uplink signal processing period, whereas the DAC converts a digital signal format into an analog signal format during a downlink signal processing period.

The beamforming unit 140 of the base station 100 can perform beamforming for the signals provided by the transceiver circuit 110. For example, the beamforming unit 140 includes a plurality of the phase converters and a plurality of power amplifiers (PA). As such, relative phases of the signals sent to each antenna of the antenna array 150 may be properly adjusted so that intensity of the signals in a designated direction is enhanced but compressed in other directions. In other words, with operation of the beamforming unit 140, the base station 100 can generate a plurality of beams in different directions or different patterns.

The processing circuit 120 is configured to process the digital signal and perform procedures of the proposed method in according to the exemplary embodiments of the present disclosure. In addition, the processing circuit 120 may be optionally coupled to the memory unit 130, so as to access a programming code, a device configuration, a codebook, and buffer or permanent data, and record a plurality of modules executable by the processor 120. Functions of the processing circuit 120 may be implemented by using a programmable unit, such as a microprocessor, a microcontroller, a digital signal processing (DSP) chip, a field programmable gate array (FPGA) and the like. The functions of the processing circuit 120 may also be implemented by an independent electronic device or an integrated circuit (IC), and the processing circuit may also be implemented in form of hardware or software.

In the present disclosure, the term "user equipment" (UE) may represent various implementations, which may include (but not limited to), for example, a mobile station, an advanced mobile station (AMS), a server, a user terminal, a desktop computer, a laptop computer, a network computer, a workstation, a personal digital assistant (PDA), a personal computer (PC), a scanner, a phone device, a pager, a camera, a television, a handheld video game device, a music device, a wireless sensor and the like. In some applications, the UE may be a fixed computer device operated in a mobile environment such as on a bus, a train, a plane, a boat, a car and the like.

Figure 1B:
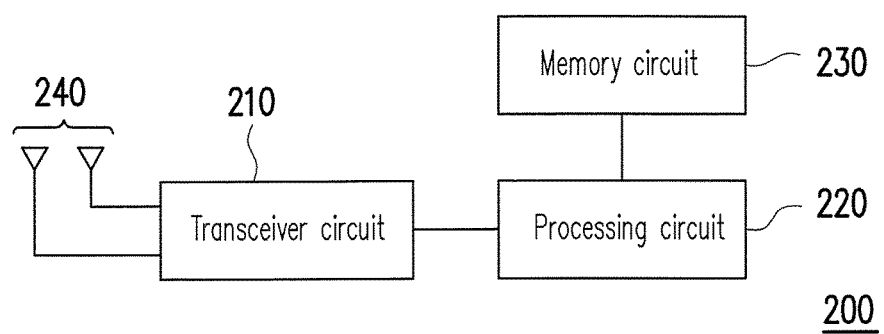
FIG. 1B is a block diagram illustrating a user equipment according to an exemplary embodiment of the present disclosure.

According to the embodiments of the present disclosure, the UE may at least be represented by function devices illustrated in FIG. 1B. A user equipment 200 may at least include (but not limited to) a transceiver circuit 210, a processing circuit 220, a memory circuit 230 (optional), and one or more antenna units 240. The memory unit 230 can store a programming code, a device configuration, buffer or permanent data, a codebook and the like. The processing circuit 220 may also be implemented in form of hardware or software. Functions of each element in the user equipment 200 are similar to those in the base station 100, and thus detailed description for each element is not repeated hereinafter. Although it is not illustrated in FIG. 1B, in an exemplary embodiment, the user equipment 200 may also include a beamforming unit for communicating with the base station 100 by using the beams with directivity.

In the exemplary embodiments of the present disclosure, a cellular system operated in an extremely high frequency band can compensate the transmission path loss by using an antenna gain acquired based on the beamforming technology. Aforesaid high frequency band is, for example, a millimeter wave frequency band around 38 GHz, but the present disclosure is not limited thereto. The beamforming technology is a technology used to send signals from multiple antennas so that the signals may be gathered in a specific direction. The base station 100 can adjust the phase of the signal sent from each of the antennas so the signals sent from all the antennas may be gathered in the specific direction to generate directional beams, such that the beams transmitted by the base station 100 may be received by the user equipment 200 located in the specific direction.

Figure 2:
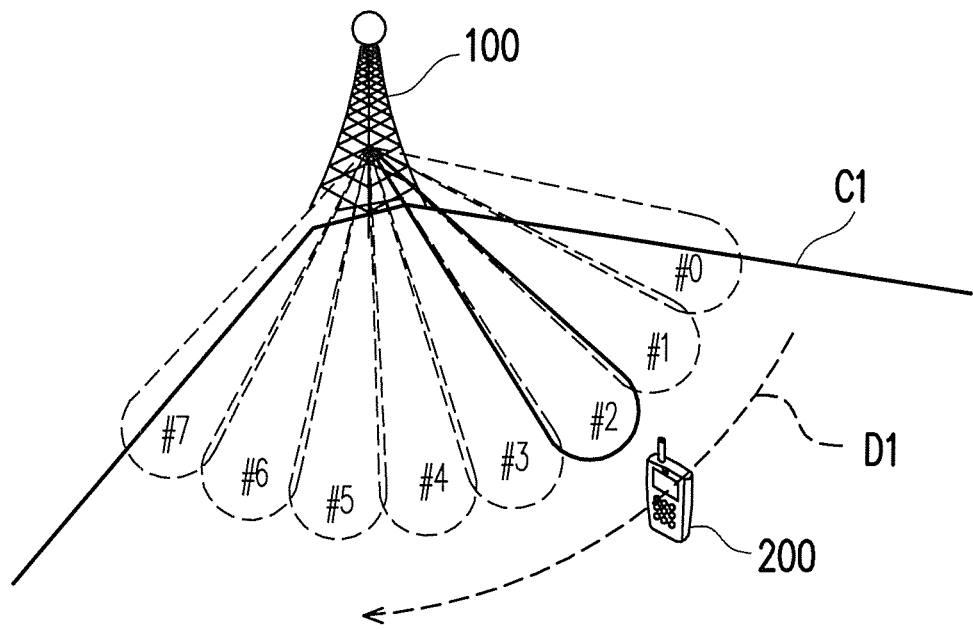
FIG. 2 is schematic diagrams illustrating millimeter wave communication with beamforming according to an exemplary embodiment of the present disclosure.

FIG. 2 is schematic diagram illustrating a hierarchical beamforming method according to an exemplary embodiment of the present disclosure. Referring to FIG. 2, the base station 100 can sequentially generate a plurality of base station beams towards different directions in a cell C1. In the present exemplary embodiment, the base station 100 can generate 8 base station beams #0 to #7 with different beam directions, and the base station 100 can sequentially transmit the base station beams #0 to #7 according to a clockwise direction D1, for example. The coverage of the base station beams #0 to #7 can cover the entire cell C1. In other words, the base station 100 can generate the base station beams #0 to #7 for covering the entire cell C1 by switching the beam direction 7 times.

In the disclosure, the base station 100 may sequentially transmit the base station beams #0 to #7 designated as scan beams in order by using a frame header of the beamforming frames defined in the following disclosure. Herein, term "scan beam" represents the base station beam transmitted in the frame header, and periodic signals for beam search and cell search and network system information for network entry procedure are transmitted through the frame header. That is, the base station 100 may transmit the periodic signals and network system information via each of the scan beams, such that at least one user equipment (e.g. the user equipment 200) is able to perform beam discovery, beam tracking and the network entry procedure wherever the at least one user equipment (e.g. the user equipment 200) is in the cell C1. The network entry procedure may be a network camp-on procedure, a handover procedure, a fallback procedure and the like, the disclosure is not limited thereto.

In other words, when the user equipment 200 enters the cell C1, the user equipment 200 and the base station 100 can perform the network entry procedure via at least one of the scan beams which is at least one of the base station beams #0 to #7, so that the user equipment 200 can synchronize with the base station 100 and acquire network system information. Take FIG. 2 as an example, the user equipment 200 can receive a beam search signal transmitted via part of the scan beams which are part of the base station beams #0 to #7 and perform a beam discovery to determine at least one schedule beam from the base station beams #0 to #7 for data transmission. For example, after receiving the three beams search signals of the scan beams #1 to #3, the user equipment 200 may report the base station 100 that beam #2 is the most appropriate beam for communication, so the base station 100 in FIG. 2 may schedule beam #2 for following data transmission. That is, beam #2 is selected to serve as a schedule beam. Herein, term "schedule beam" represents the beam transmitted in the payload region of the frame, and the schedule beam is scheduled and transmitted for data transmission between the user equipment 200 and the base station 100. The base station 100 and the user equipment 200 first perform the network entry procedure by using the scan beam, and then perform the user equipment connection by using the schedule beam, so as to perform the data packet transmission by using the schedule beam. As the result, the data and the control signals could be transmitted within the mmWave band by using the beamforming technique, and the network entry process would be also done via the mmWave beams.

Figure 3A:
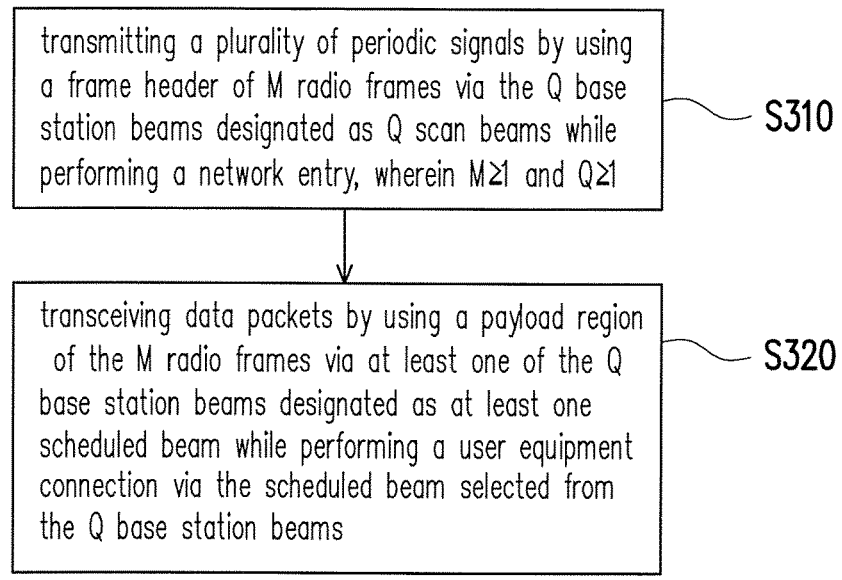
FIG. 3A is a flowchart illustrating the beamforming method operated by the base station according to an exemplary embodiment of the present disclosure.

FIG. 3A is a flowchart illustrating the beamforming method operated by the base station according to an exemplary embodiment of the present disclosure. In step S310, in a network entry phase, the processing circuit 120 may transmit a plurality of periodic signals by using a frame header of M radio frames via Q base station beams designated as Q scan beams while performing a network entry, wherein M≥1 and Q≥1. In one exemplary embodiment, according to the preferred scan beam used by the user equipment for reporting the feedback massage, the processing circuit 120 may be aware of the position of the user equipment, so as to schedule the schedule beam to transmit the data packets. Therefore, in step S320, in a user equipment connection phase, the processing circuit 120 may transceive data packets by using a payload region of the M radio frames via at least one of the Q base station beams designated as at least one scheduled beam while performing a user equipment connection via the scheduled beam selected from the Q base station beams.

Figure 3B:
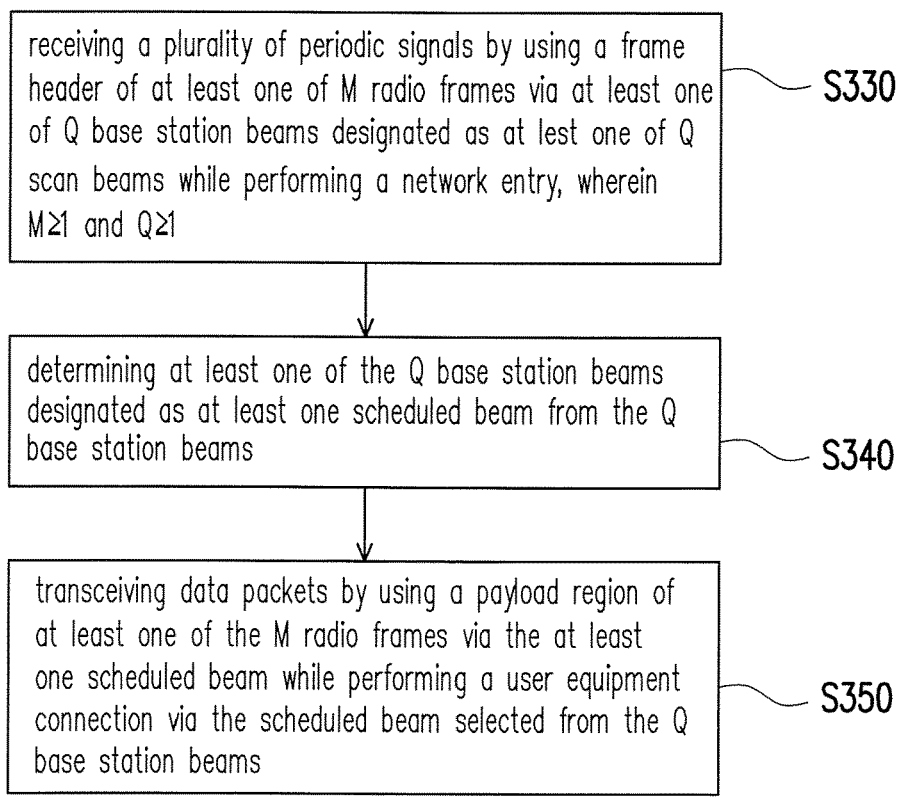
FIG. 3B is a flowchart illustrating the beamforming method operated by the user equipment according to an exemplary embodiment of the present disclosure.

On the other hand, FIG. 3B is a flowchart illustrating the beamforming method operated by the user equipment according to an exemplary embodiment of the present disclosure. In step S330, in a network entry phase, the processing circuit 220 may receive a plurality of periodic signals by using a frame header of at least one of M radio frames via at least one of Q base station beams designated as at least one of Q scan beams while performing a network entry, wherein M≥1 and Q≥1. In step S340, in the network entry phase or a user equipment connection phase, the processing circuit 220 may determine at least one of Q scan beams designated as at least one scheduled beam from the Q base station beams. The processing circuit 220 may select the scheduled beam from the base station beams base on signal character measurement (but not limited thereto). In step S350, in the user equipment connection phase, the processing circuit 220 may transceive data packets by using a payload region of at least one of the M radio frames via the at least one scheduled beam while performing a user equipment connection via the scheduled beam selected from the Q base station beams.

In addition, in the user equipment connection phase, the user equipment 200 may move in the cell, so the base station beams capable of being received by the user equipment 200 are dynamically varied along with the change of the position of the user equipment 200. That is, beam tracking for switching the schedule beam is required for seamless data transmission. In one exemplary embodiment, except for using the scan beams for beam discovery in network entry phase, the scan beams carrying the beam search signal may be also used for beam tracking in UE connection phase to switch the schedule beam. In other words, for a moving user equipment, while transmitting the data packets, the base station 100 and the user equipment 200 may simultaneously perform beam tracking via the scan beams.

Figure 4:
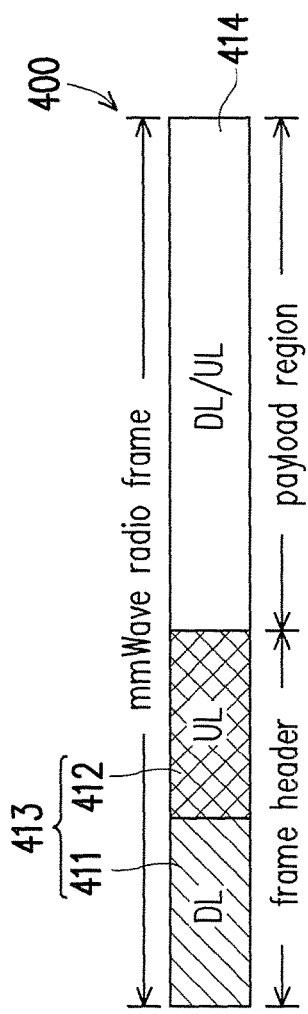
FIG. 4 is a schematic diagram illustrating the frame structure for mmWave communication according to an exemplary embodiment of the present disclosure.

FIG. 4 is a schematic diagram illustrating the frame structure for mmWave communication according to an exemplary embodiment of the present disclosure. The radio frame 400 includes the frame header 413, and the frame header 413 is located at the start of the frame 400. The frame header 413 transmitted via each of the scan beams may carry network system information of the network entry procedure, a beam search signal, a cell search signal and a downlink control signal. For example, the beam search signal respectively corresponding to the scan beams may be transmitted via the scan beams by using the corresponding frame header. In other words, the base station 100 will periodically transmit the control signals and the system information related to the network entry procedure via each of the scan beams and the corresponding frame header. In addition, the payload region 414 of the radio frame 400 is used for DL/UL data transmission, and the schedule beam used for DL/UL data transmission is dynamically allocated in the payload region 414 of the radio frame depending on the relative position of the base station and the user equipment.

Further, the frame header 413 includes a DL frame header 411 and a UL frame header 412, and the order of the DL frame header 411 and the UL frame header 412 is not limit in the disclosure. In DL frame header 411, beam discovery and network entry could be performed. More specifically, at least one beam search signal with its own beam identifier may be transmitted by the base station via at least one scan beam in DL frame header 411. The user equipment may detect the beam search signal, and the user equipment may notice the base station that the user equipment is located in which scan beams by a preferred scan beam. That is, the base station may transmit the beam search signals by using the frame header of the radio frames via the scan beams, and the user equipment may receive at least one beam search signal by using the frame header of the radio frames via the at least one scan beam.

Besides, in one exemplary embodiment, synchronization signals or reference signals of network entry procedure may be transmitted via the scan beams by using the DL frame header 411. In one exemplary embodiment, the beam search signals with the own beam identifier may be serving as synchronization signals of network entry procedure for detecting the timing offset and the frequency offset. In one exemplary embodiment, the base station may detect a random access preamble via the scan beams by using UL frame header 412, but the disclosure is not limited thereto. Once the base station is aware of the preferred beam for data transmission after performing beam discovery and network entry procedure, the base station may schedule the schedule beam and then transmit data packet by using the payload region 414 of the radio frame 400.

Figure 5:
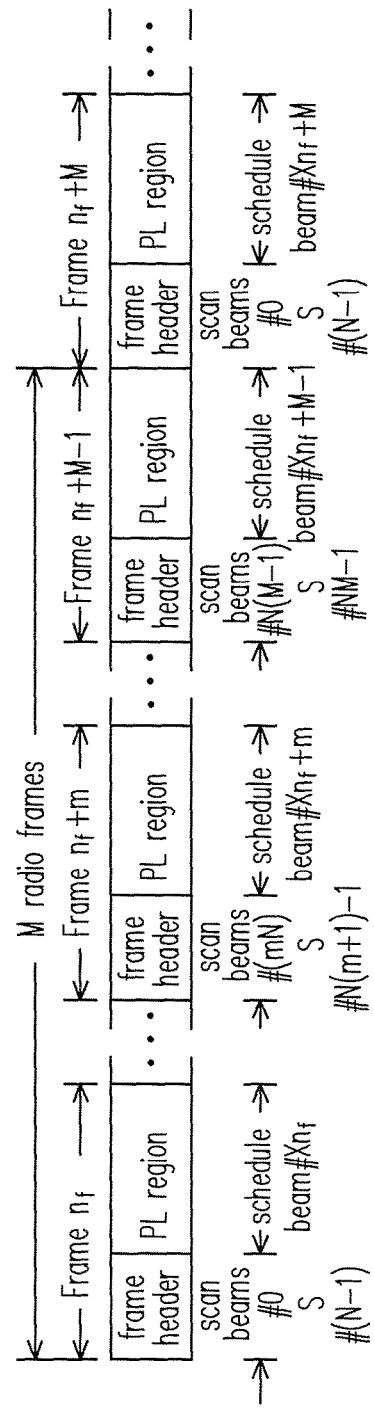
FIG. 5 is a schematic diagram illustrating the radio frames of beamforming mechanism according to an exemplary embodiment of the present disclosure.

FIG. 5 is a schematic diagram illustrating the radio frames of beamforming mechanism according to an exemplary embodiment of the present disclosure. Referring to FIG. 5, it is assumed that the base station can generate Q scan beams with different beam directions within one cell, and the Q scan beams are allocated to being transmitted by the base station over M mmWave radio frames. That is, N scan beams among the Q scan beams are allocated into each of the M radio frames (N=Q/M). Each of the Q scan beams is periodically transmitted every M radio frames, and the schedule beam is scheduled into the payload of the M radio frames for transceiving the data packets. In detail, frame $n_f$ includes a frame header and a payload (PL) region. In the frame header of the $(n_f)^{th}$ frame, the scan beams #0 to #(N−1) carrying the periodic signals (such as beam search signals, cell search signal, and so on), the downlink control signals and network system information are sequentially transmitted. In the payload region of the $(n_f)^{th}$ frame, the schedule beam #$Xn_f$ loaded with the data packets is transmitted.

Similarly, after m frames, in the frame header of the $(n_f+m)^{th}$ frame, the scan beams #mN to #N(m+1)−1 carrying the periodic signals (such as beam search signals, cell search signal, and so on), the downlink control signals and network system information are sequentially transmitted. In the payload region of the $(n_f+m)_{th}$ frame, the schedule beam $\#X_{n_f+m}$ loaded with the data packets is transmitted. After M−1 frames, in the frame header of the $(n_f+M-1)^{th}$ frame, the scan beams #(M−1)N to #NM−1 carrying the periodic signals, the downlink control signals and network system information are sequentially transmitted. In the payload region of the $(n_f+M-1)^{th}$ frame, the schedule beam $\#X_{n_f+M-1}$ loaded with the data packets is transmitted. That is, number of scan beams allocated in one frame header may be configurable, which is determined by number of base station beams Q and beacon period M of the periodic signals. Table I is an exemplary of configuration of scan beams.

TABLE I

| BS scan beam configuration index | Number of beams at base station | beacon period M of scan beams | Number of scan beams in frame header |
|---|---|---|---|
| #0 | Q = 2 | M = 2 | N = 1 |
| #1 |  | M = 1 | N = 2 |
| #2 | Q = 4 | M = 4 | N = 1 |
| #3 |  | M = 2 | N = 2 |
| #4 |  | M = 1 | N = 4 |
| #5 | Q = 8 | M = 8 | N = 1 |
| #6 |  | M = 4 | N = 2 |
| #7 |  | M = 2 | N = 4 |
| #8 |  | M = 1 | N = 8 |
| #9 | Q = 16 | M = 16 | N = 1 |
| #10 |  | M = 8 | N = 2 |
| #11 |  | M = 4 | N = 4 |
| #12 |  | M = 2 | N = 8 |
| #13 |  | M = 1 | N = 16 |

In addition, except the scan beams may be transmitted over M radio frame, the scan beams transmitted in one frame header may be allocated in one single subframe of the frame header or allocated in multiple subframes of the frame header. In localized type, the N scan beams could be sequentially allocated in single DL/UL subframe in a frame header. On the other hand, in distributed type, the N scan beams could be sequentially allocated in multiple DL/UL subframes in a frame header. Comparing the localized type with the distributed type, the localized type may have shorter frame header. Besides, since guard period for downlink and uplink switch (millisecond level) is longer than guard period for beam switch (nanosecond level), the localized type has shorter guard period for DL/UL switch.

Figure 6A:
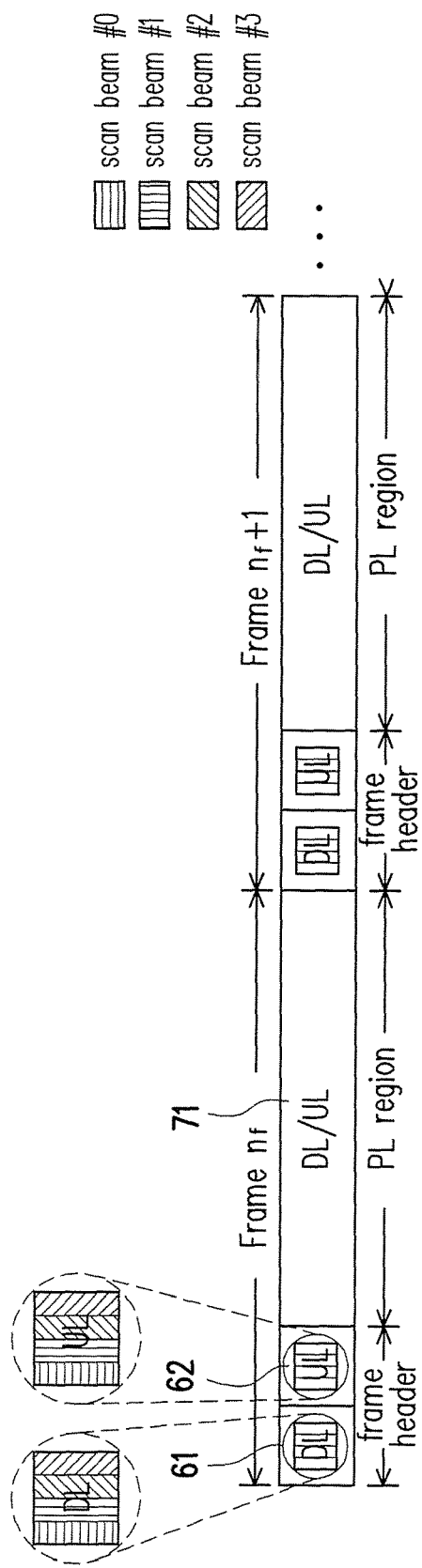
FIGS. 6A and 7A are a schematic diagram illustrating allocation of the scan beams in frame header with localized type according to an exemplary embodiment of the present disclosure.
Figure 6B:
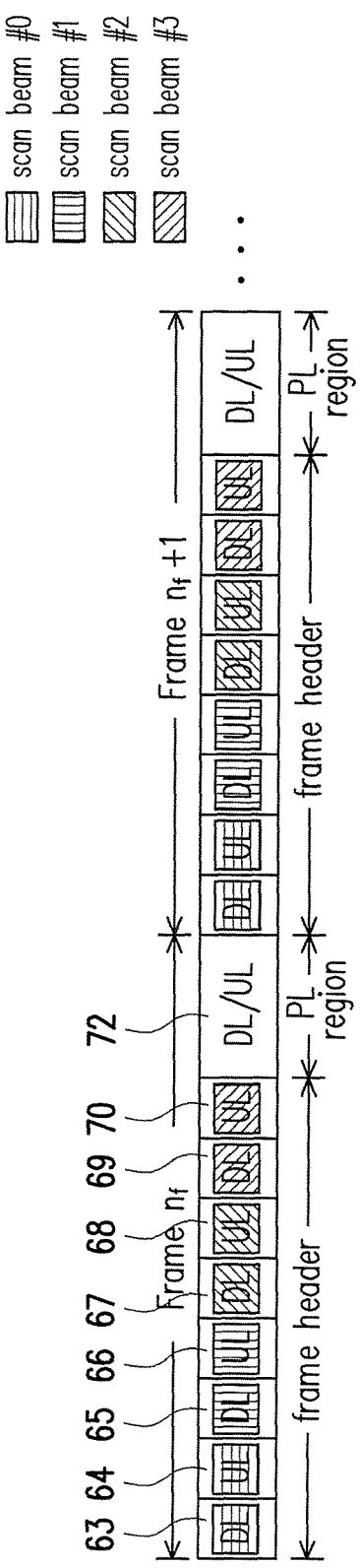
FIGS. 6B and 7B are a schematic diagram illustrating allocation of the scan beams in frame header with distributed type according to an exemplary embodiment of the present disclosure.

FIG. 6A is a schematic diagram illustrating allocation of the scan beams in frame header with localized type according to an exemplary embodiment of the present disclosure. FIG. 6B is a schematic diagram illustrating allocation of the scan beams in frame header with distributed type according to an exemplary embodiment of the present disclosure. Referring to FIG. 6A, it is assuming that the base station may generate 4 scan beams with 4 different beam directions within a cell (Q=4, scan beams #0 to #3), and the base station transmits the scan beams #0 to #3 in a single subframe of the frame header of one single radio frame (M=1 and N=4). In FIG. 6A, for the $(n_f)^{th}$ frame, the scan beams #0 to #3 carrying the downlink signal are allocated in the same subframe 61 of the frame header, and the scan beams #0 to #3 carrying the uplink signal are allocated in the same subframe 62 of frame header.

Referring to FIG. 6B, it is also assuming that the base station may generate 4 scan beams with 4 different beam directions within a cell (Q=4, scan beams #0 to #3), and that base station transmits the scan beams #0 to #3 in multiple subframes of the frame header of one single radio frame (M=1 and N=4). In FIG. 6B, for the $(n_f)^{th}$ frame, the scan beams #0 to #3 carrying the downlink signal are allocated respectively in the different subframes 63, 65, 67 and 69 of the frame header, and the scan beams #0 to #3 carrying the uplink signal are allocated respectively in the different subframes 64, 66, 68 and 70 of frame header. Referring to FIG. 6A and FIG. 6B, the payload region 71 used for transmitting the data packets is longer than the payload region 72.

Figure 7A:
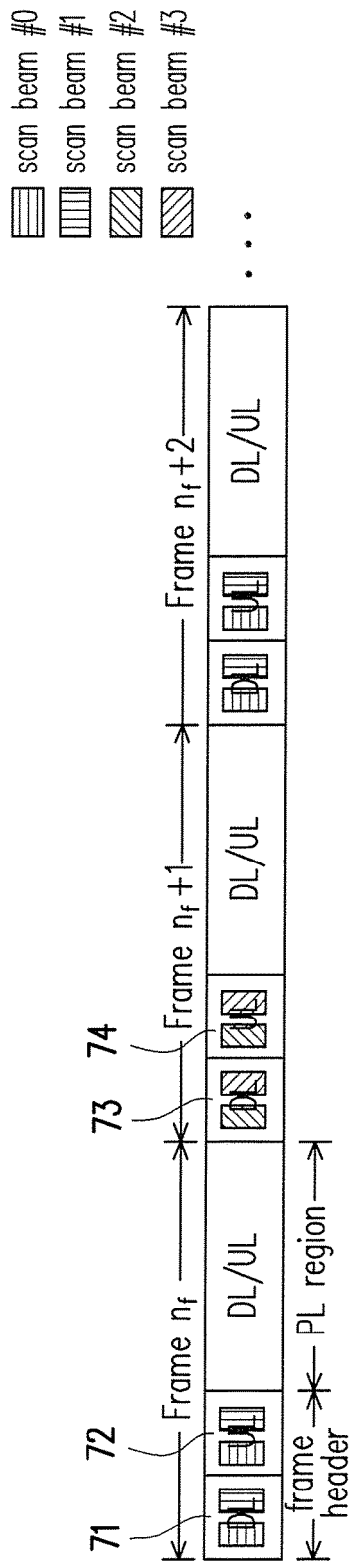
Figure 7B:
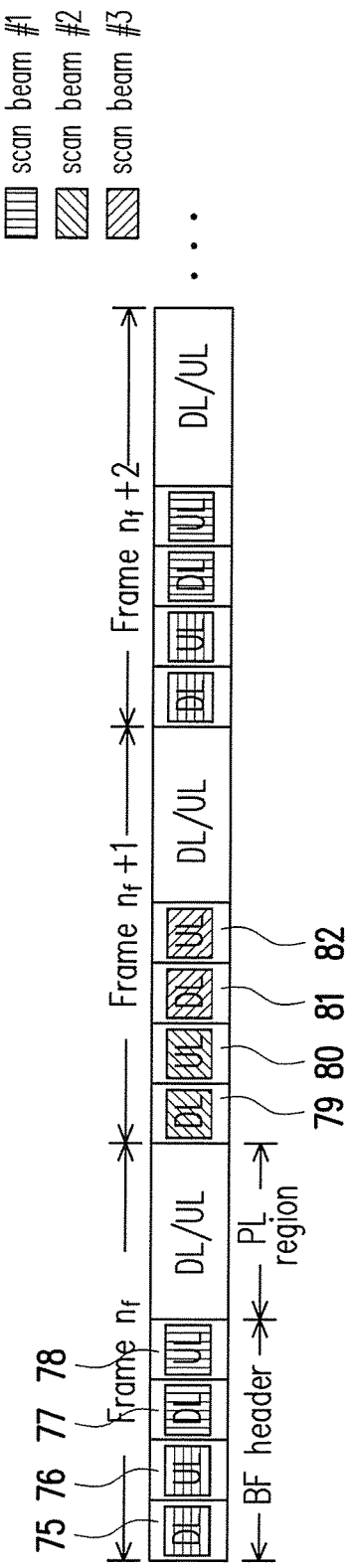

FIG. 7A is a schematic diagram illustrating allocation of the scan beams in frame header with localized type according to an exemplary embodiment of the present disclosure. FIG. 7B is a schematic diagram illustrating allocation of the scan beams in frame header with distributed type according to an exemplary embodiment of the present disclosure. Referring to FIG. 7A, it is assuming that the base station may generate 4 scan beams with 4 different beam directions within a cell (Q=4, scan beams #0 to #3), and the base station transmits the scan beams #0 to #3 in 2 subframes of the frame header of 2 different radio frames (M=2 and N=2). In FIG. 6A, for the $(n_f)^{th}$ frame, the scan beams #0 to #1 carrying the downlink signal are allocated in the same subframe 71 of the frame header, and the scan beams #0 to #1 carrying the uplink signal are allocated in the same subframe 72 of frame header. For the $(n_f+1)^{th}$ frame, the scan beams #2 to #3 carrying the downlink signal are allocated in the same subframe 73 of the frame header, and the scan beams #2 to #3 carrying the uplink signal are allocated in the same subframe 74 of frame header.

Referring to FIG. 7B, it is also assuming that the base station may generate 4 scan beams with 4 different beam directions within a cell (Q=4, scan beams #0 to #3), and that base station transmits the scan beams #0 to #3 in 4 subframes of the frame header of two different radio frame (M=2 and N=2). In FIG. 7B, for the $(n_f)^{th}$ frame, the scan beams #0 to #1 carrying the downlink signal are allocated respectively in the different subframes 75 and 77 of the frame header, and the scan beams #0 to #1 carrying the uplink signal are allocated respectively in the different subframes 76 and 78 of frame header. For the $(n_f+1)^{th}$ frame, the scan beams #2 to #3 carrying the downlink signal are allocated respectively in the subframes 79 and 81 of the frame header, and the scan beams #2 to #3 carrying the uplink signal are allocated respectively in the same subframes 80 and 82 of frame header. It could be know that, the frame header in localized type is shorter than the frame header in distributed type. However, the order for transmitting the scan beams and the sequence of the DL/UL subframes in a frame are not limited in the disclosure.

Based on above, the base station can periodically transmit the beam search signal, the cell search signal, the system information and the control signal related to and required by the network entry procedure via different scan beams and the corresponding frame header. But however, whether the packet transmission block of the payload region is scheduled may be dynamically determined according to the communication requirements, the channel criteria and the system networking capability of the user equipment 200.

Figure 8:
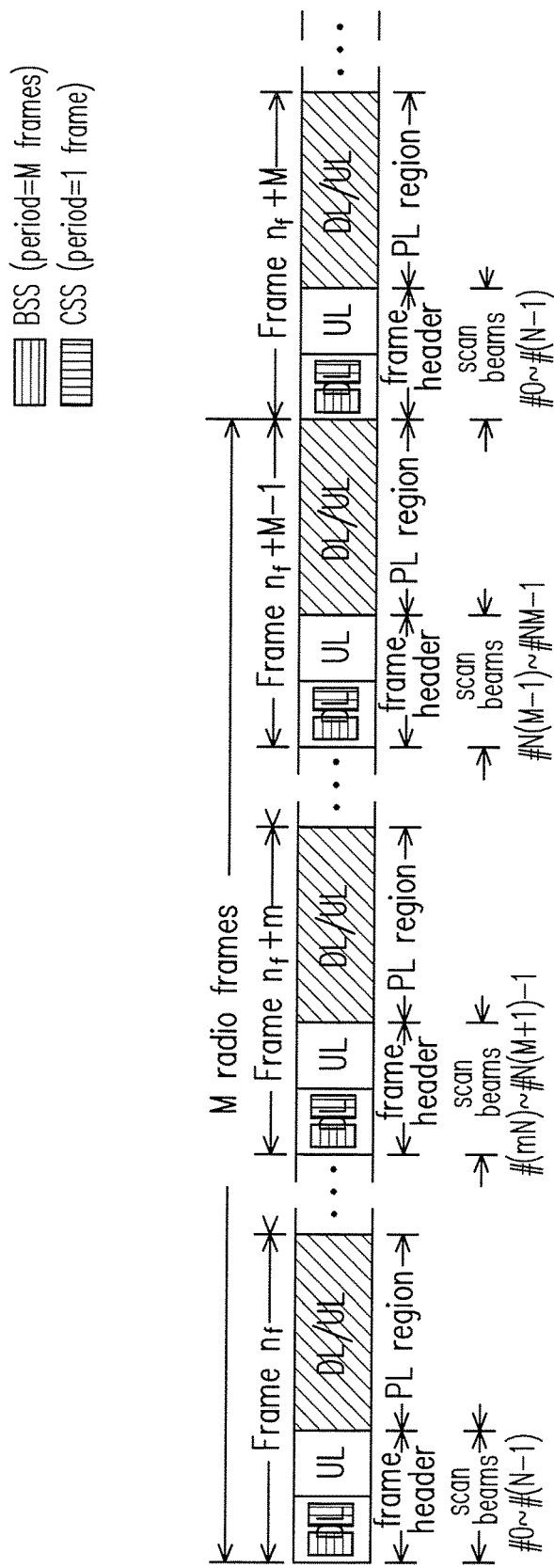
FIG. 8 is a schematic diagram illustrating the periodic signalling on the scan beams according to an exemplary embodiment of the present disclosure.

FIG. 8 is a schematic diagram illustrating the periodic signalling on the scan beams according to an exemplary embodiment of the present disclosure. Referring to FIG. 8, the periodic signals transmitted via the scan beams comprises beam search signals (BSS) and a cell search signal (CSS). The beam search signals respectively corresponding to the Q scan beams, and each of the beam search signals carries a beam identifier. The scan beams are related to different beam identifiers. In addition, the cell search signal carries a cell identifier. In one exemplary embodiment, the base station signals the beam search signals and the cell search signal via the scan beams by using the corresponding frame header. In FIG. 8, Q scan beams are transmitted over M radio frames, which are the $(n_f)^{th}$ frame to the $(n_f+M-1)^{th}$ frame. The frame headers of the $(n_f)^{th}$ frame to the $(n_f+M-1)^{th}$ frame include the cell search signal with the same cell identifier. Therefore, the period of the CSS is one frame.

Besides, the frame header of the $(n_f)^{th}$ frame carries N beam search signals with different beam identifiers respectively corresponding to the beam #0 to the beam #(N−1). The frame header of the $(n_f+m)^{th}$ frame carries N beam search signals with different beam identifiers respectively corresponding to the beam #(mN) to the beam #(N(m+1)−1). The frame header of the $(n_f+M-1)^{th}$ frame carries N beam search signals with different beam identifiers respectively corresponding to the beam #N(M−1) to the beam #(NM−1). After M frames pass, the frame header of the $(n_f+M)^{th}$ frame carries N beam search signals with different beam identifiers respectively corresponding to the beam #0 to the beam #(N−1). That is, the period of the beam search signal with the same beam identifier is M frames.

It should be noted that the beam search signal can provide the beam search, a frequency synchronism and timing information for the user equipment covered by at least one of the scan beams. Besides, in one exemplary embodiment, the base station and the user equipment perform cell search procedure by using the cell search signal. The cell search signal carrying the same cell identifier is allocated in the frame header of each of the M radio frames. The cell search signal, such as a primary synchronization signal (PSS) and a secondary synchronization signal (SSS) in LTE specification, may also be sent via the scan beams by using the frame header of each of the frames. The cell search signal can provide cell search information for the user equipment. In one exemplary embodiment, the cell search signal may also provide the frequency synchronism and the timing information at the same time. In other words, the base station will periodically send the control signal and the system information related to the network entry procedure via each of the scan beams and the corresponding frame header.

Figure 9:
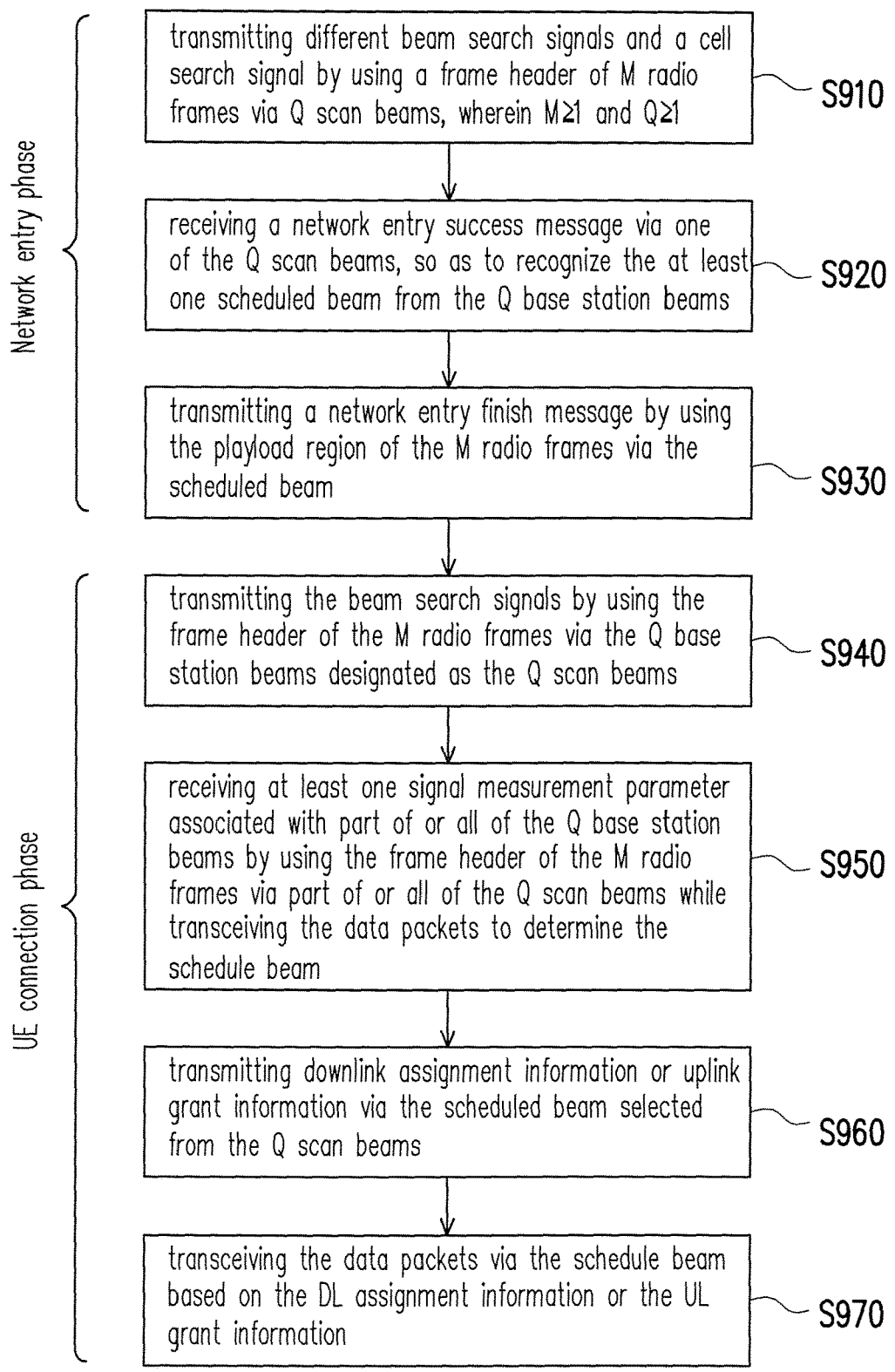
FIG. 9 is a flowchart illustrating the beamforming method operated by the base station according to an exemplary embodiment of the present disclosure.

FIG. 9 is a flowchart illustrating the beamforming method operated by the base station according to an exemplary embodiment of the present disclosure. In step S910, the base station 100 may transmit different beam search signals and a cell search signal by using a frame header of M radio frames via Q scan beams, wherein M≥1 and Q≥1. Further, through transmitting the different beam search signals and the cell search signal, at least one user equipment may synchronize with at least one base station (e.g. base station 100) by using the frame header of the M radio frames via the Q base station beams designated as Q scan beams. In step S920, the base station 100 may receive a network entry success message via one of the Q scan beams, so as to recognize the at least one scheduled beam from the Q base station beams. In step S930, the base station 100 may transmit a network entry finish message by using the payload region of the M radio frames via the scheduled beam. Herein, steps S910 to S930 refer to a network entry phase during which the base station 100 performs the beam discovery and the network entry procedure by using the scan beams and the schedule beam.

In step S940, the base station 100 may transmit the beam search signals by using the frame header of the M radio frames via the Q base station beams designated as the Q scan beams. In step S950, the base station 100 may receive at least one signal measurement parameter associated with part of or all of the Q base station beams by using the frame header of the M radio frames via part of or all of the Q scan beams while transceiving the data packets, so as to determine the schedule beam for transceiving the data packets and schedule the schedule beam. The signal measurement parameters may be a received signal strength indicator (RSSI) or a signal-to-noise ratio (SNR) obtaining by measurement any DL signals transmitted in the frame header by the base station, but the present disclosure is not limited thereto. In step S960, the base station 100 may transmit downlink assignment information or uplink grant information via the scheduled beam selected from the Q base station beams. In step S970, the base station 100 may transceive the data packets via the schedule beam based on the DL assignment information or the UL grant information. Herein, steps S940 to S970 refer to a user equipment connection phase during which the base station 100 performs beam tracking by using the scan beams and data packet transmission by using the schedule beams.

Figure 10:
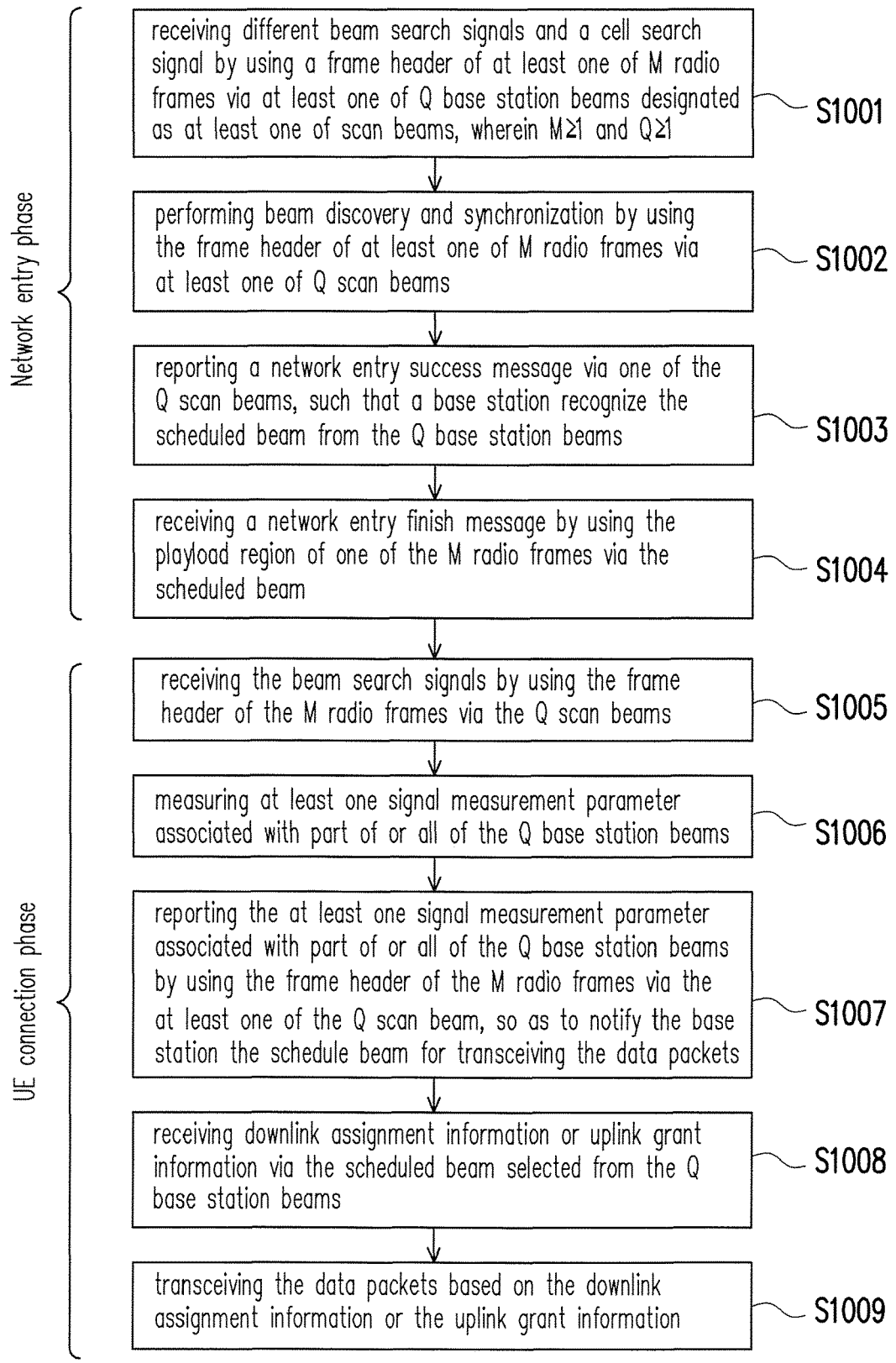
FIG. 10 is a flowchart illustrating the beamforming method operated by the user equipment according to an exemplary embodiment of the present disclosure.

FIG. 10 is a flowchart illustrating the beamforming method operated by a user equipment according to an exemplary embodiment of the present disclosure. In step S1001, the user equipment 200 may receive different beam search signals and a cell search signal by using a frame header of at least one of M radio frames via at least one of Q base station beams designated as at least one of scan beams, wherein M≥1 and Q ≥1. In step S1002, the user equipment 200 may perform beam discovery and synchronization by using the frame header of at least one of M radio frames via the at least one of Q scan beams. In step S1003, the user equipment 200 may report a network entry success message via one of the Q scan beams, such that a base station 100 recognize the scheduled beam from the Q base station beams. In step S1004, the user equipment 200 may receive a network entry finish message by using the payload region of one of the M radio frames via the scheduled beam. Herein, steps S1001 to S1004 refer to a network entry phase during which the user equipment 200 performs the beam discovery and the network entry procedure by using the scan beams and the schedule beam.

In step S1005, the user equipment 200 may receive the beam search signals by using the frame header of the M radio frames via the Q scan beams. In step S1006, the user equipment 200 may measure at least one signal measurement parameter associated with part of or all of the Q base station beams. In step S1007, the user equipment 200 may report the at least one signal measurement parameter associated with part of or all of the Q base station beams by using the frame header of the M radio frames via the at least one of the Q scan beam, so as to notify the base station the schedule beam for transceiving the data packets. In step S1008, the user equipment 200 may receive downlink assignment information or uplink grant information via the scheduled beam selected from the Q base station beams. In step S1009, the user equipment 200 may transceive the data packets based on the downlink assignment information or the uplink grant information. Herein, steps S1005 to S1009 refer to a user equipment connection phase during which the user equipment 200 performs beam tracking by using the scan beams and data packet transmission by using the schedule beams.

In summary, the base station and the user equipment in the present disclosure can perform beam discovery and the network entry procedure at least via the scan beams periodically transmitted by the base station. Further, the base station and the user equipment perform the data packet transmission via the schedule beam dynamically transmitted by the base station. Accordingly, the beamforming method of the present disclosure can effectively manage beams and select the most preferred beam for data transmission.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A beamforming method of millimeter wave communication, adapted for a base station which is capable of generating Q base station beams, and the method comprising:
transmitting a plurality of periodic signals by using a frame header of M radio frames via the Q base station beams designated as Q scan beams while performing a network entry, wherein at least N of the Q scan beams are allocated into the frame header of the M radio frames, wherein $M > 1$, $Q > 1$, and N is depending on a ratio of Q and M, and at least two of the Q scan beams are allocated into the frame header of one of the M radio frames; and
transceiving data packets by using a payload region of the M radio frames via at least one of the Q base station beams designated as at least one scheduled beam while performing a user equipment connection via the scheduled beam selected from the Q base station beams.

2. The method according to claim 1, further comprising:
receiving a network entry success message via one of the Q scan beams, so as to recognize the at least one scheduled beam from the Q base station beams; and
transmitting a network entry finish message by using the payload region of the M radio frames via the scheduled beam.

3. The method according to claim 1, wherein the step of transmitting the periodic signals by using the frame header of the M radio frames via the Q base station beams designated as the Q scan beams while performing the network entry comprises:
synchronizing at least one user equipment by using the frame header of the M radio frames via the Q scan beams.

4. The method according to claim 1, wherein the periodic signals comprise a plurality of beam search signals respectively corresponding to the Q scan beams, each of the beam search signals carries a beam identifier, and the scan beams are related to different beam identifiers.

5. The method according to claim 4, wherein the periodic signals comprise a cell search signal, and the cell search signal carries a cell identifier.

6. The method according to claim 5, wherein the step of transmitting the periodic signals by using the frame header of the M radio frames via the Q base station beams designated as the Q scan beams while performing the network entry based on the Q scan beams comprises:
performing cell search procedure by using the cell search signal, wherein the cell search signal carrying the same cell identifier is allocated in the frame header of each of the M radio frames.

7. The method according to claim 4, further comprising:
transmitting the beam search signals by using the frame header of the M radio frames via the Q scan beams while transceiving the data packets; and
receiving at least one signal measurement parameter associated with part of or all of the Q scan beams by using the frame header of the M radio frames via part of or all of the Q scan beams while transceiving the data packets, so as to determine the schedule beam for transceiving the data packets and schedule the schedule beam.

8. The method according to claim 1, wherein each of the Q scan beams is periodically transmitted every M radio frames, and the at least one schedule beam selected from the Q base station beams is scheduled into the payload of the M radio frames for transceiving the data packets.

9. The method according to claim 1, wherein the step of transceiving the data packets by using the payload region of the M radio frames via the at least one of the Q base station beams designated as at least one scheduled beam while performing the user equipment connection via the scheduled beam selected from the Q base station beams comprising:
transmitting downlink assignment information or uplink grant information via the scheduled beam selected from the Q base station beams, so as to transceive the data packets based on the downlink assignment information or the uplink grant information.

10. A base station, which is capable of generating Q base station beams, comprising:
a transceiver circuit, configured to transmit and receive a wireless signal of millimeter wave communication; and
a processing circuit, coupled to the transceiver circuit, and configured to:
transmit a plurality of periodic signals by using a frame header of M radio frames via the Q base station beams designated as Q scan beams while performing a network entry, wherein at least N of the Q scan beams are allocated into the frame header of the M radio frames, wherein $M > 1$, $Q > 1$, and N is depending on a ratio of Q and M, and at least two of the Q scan beams are allocated into the frame header of one of the M radio frames; and
transceive data packets by using a payload region of the M radio frames via at least one of the Q base station beams designated as at least one scheduled beam while performing a user equipment connection via the scheduled beam selected from the Q base station beams.

11. The base station according to claim 10, wherein the processing circuit is further configured to:
receive a network entry success message via one of the Q scan beams, so as to recognize the at least one scheduled beam from the Q base station beams; and
transmit a network entry finish message by using the payload region of the M radio frames via the scheduled beam.

12. The base station according to claim 10, wherein the processing circuit is further configured to:
synchronize at least one user equipment by using the frame header of the M radio frames via the Q scan beams.

13. The base station according to claim 10, wherein the periodic signals comprise a plurality of beam search signals respectively corresponding to the Q scan beams, each of the beam search signals carries a beam identifier, and the scan beams are related to different beam identifiers.

14. The base station according to claim 13, wherein the periodic signals comprise a cell search signal, and the cell search signal carries a cell identifier.

15. The base station according to claim 14, wherein the processing circuit is further configured to:
  perform cell search procedure by using the cell search signal, wherein the cell search signal carrying the same cell identifier is allocated in the frame header of each of the M radio frames.

16. The base station according to claim 13, wherein the processing circuit is further configured to:
  transmit the beam search signals by using the frame header of the M radio frames via the Q scan beams while transceiving the data packets; and
  receive at least one signal measurement parameter associated with part of or all of the Q scan beams by using the frame header of the M radio frames via part of or all of the Q scan beams while transceiving the data packets, so as to determine the schedule beam for transceiving the data packets and schedule the schedule beam.

17. The base station according to claim 10, wherein each of the Q scan beams is periodically transmitted every M radio frames, and the at least one schedule beam selected from the Q base station beams is scheduled into the payload of the M radio frames for transceiving the data packets.

18. The base station according to claim 10, wherein the processing circuit is further configured to:
  transmit downlink assignment information or uplink grant information via the scheduled beam selected from the Q base station beams, so as to transceive the data packets based on the downlink assignment information or the uplink grant information.

19. A beamforming method of millimeter wave communication, adapted for a user equipment, and the method comprising:
  receiving a plurality of periodic signals by using a frame header of at least one of M radio frames via at least one of Q base station beams designated as at least one of Q scan beams while performing a network entry, wherein at least N of the Q scan beams are allocated into the frame header of the M radio frames, wherein $M > 1$, $Q > 1$, and is depending on a ratio of Q and M, and at least two of the Q scan beams are allocated into the frame header of one of the M radio frames;
  determining at least one of the Q base station beams designated as at least one scheduled beam from the Q base station beams; and
  transceiving data packets by using a payload region of at least one of the M radio frames via the at least one scheduled beam while performing a user equipment connection via the scheduled beam selected from the Q base station beams.

20. The method according to claim 19, further comprising:
  reporting a network entry success message via one of the Q scan beams, such that a base station recognizes the scheduled beam from the Q base station beams; and
  receiving a network entry finish message by using the payload region of one of the M radio frames via the scheduled beam.

21. The method according to claim 19, further comprising:
  synchronizing with a base station by using the frame header of at least one of the M radio frames via at least one of the Q scan beams.

22. The method according to claim 19, wherein the periodic signals comprise a plurality of beam search signals respectively corresponding to the Q scan beams, each of the beam search signals carries a beam identifier, and the Q scan beams are related to different beam identifiers.

23. The method according to claim 22, wherein the periodic signals comprise a cell search signal, and the cell search signal carries a cell identifier.

24. The method according to claim 23, wherein the step of receiving the periodic signals by using the frame header of at least one of M radio frames via the at least one of Q base station beams designated as the at least one of Q scan beams while performing the network entry comprises:
  performing cell search procedure by using the cell search signal, wherein the cell search signal carrying the same cell identifier is allocated in the frame header of each of the M radio frames.

25. The method according to claim 22, further comprising:
  receiving the beam search signals by using the frame header of the M radio frames via the Q scan beams while transceiving the data packets; and
  reporting at least one signal measurement parameter associated with part of or all of the Q scan beams by using the frame header of the M radio frames via part of or all of the Q scan beams while transceiving the data packets, so as to notify the base station the schedule beam for transceiving the data packets.

26. The method according to claim 19, wherein each of the Q scan beams is periodically transmitted every M radio frames, and the at least one schedule beam selected from the Q base station beams is scheduled into the payload of the M radio frames for transceiving the data packets.

27. The method according to claim 19, wherein the step of transceiving the data packets by using the payload region of the M radio frames via the at least one scheduled beam while performing the user equipment connection via the scheduled beam selected from the Q base station beams comprising:
  receiving downlink assignment information or uplink grant information via the scheduled beam selected from the Q base station beams, so as to transceive the data packets based on the downlink assignment information or the uplink grant information.

28. A user equipment, comprising:
  a transceiver circuit, configured to transmit and receive a wireless signal; and
  a processing circuit, coupled to the transceiver circuit, and configured to:
  receive a plurality of periodic signals by using a frame header of at least one of M radio frames via at least one of Q base station beams designated as at least one of Q scan beams while performing a network entry, wherein at least N of the Q scan beams are allocated into the frame header of the M radio frames, wherein $M > 1$, $Q > 1$, and N is depending on a ratio of Q and M, and at least two of the Q scan beams are allocated into the frame header of one of the M radio frames;
  determine at least one of the Q base station beams designated as at least one scheduled beam from the Q base station beams; and
  transceive data packets by using a payload region of at least one of the M radio frames via the at least one scheduled beam while performing a user equipment connection via the scheduled beam selected from the Q base station beams.

29. The user equipment according to claim 28, wherein the processing circuit is further configured to:
report a network entry success message via one of the Q scan beams, such that a base station recognizes the scheduled beam from the Q base station beams; and
receive a network entry finish message by using the payload region of one of the M radio frames via the scheduled beam.

30. The user equipment according to claim 28, wherein the processing circuit is further configured to:
synchronize with a base station by using the frame header of at least one of the M radio frames via at least one of the Q scan beams.

31. The user equipment according to claim 28, wherein the periodic signals comprise a plurality of beam search signals respectively corresponding to the Q scan beams, each of the beam search signals carries a beam identifier, and the Q scan beams are related to different beam identifiers.

32. The user equipment according to claim 31, wherein the periodic signals comprise a cell search signal, and the cell search signal carries a cell identifier.

33. The user equipment according to claim 32, wherein the processing circuit is further configured to:
perform cell search procedure by using the cell search signal, wherein the cell search signal carrying the same cell identifier is allocated in the frame header of each of the M radio frames.

34. The user equipment according to claim 31, wherein the processing circuit is further configured to:
receive the beam search signals by using the frame header of the M radio frames via the Q scan beams while transceiving the data packets; and
report at least one signal measurement parameter associated with part of or all off the Q scan beams by using the frame header of the M radio frames via part of or all of the Q scan beams while transceiving the data packets, so as to notify a base station the schedule beam for transceiving the data packets.

35. The user equipment according to claim 28, wherein each of the Q scan beams is periodically transmitted every M radio frames, and the at least one schedule beam selected from the Q base station beams is scheduled into the payload of the M radio frames for transceiving the data packets.

36. The user equipment according to claim 28, wherein the processing circuit is further configured to:
receive downlink assignment information or uplink grant information via the scheduled beam selected from the Q base station beams, so as to transceive the data packets based on the downlink assignment information or the uplink grant information.

* * * * *